Patent 3,449,367

CHROMIUM PHOSPHINATE COMPLEXES

James Ping King, Lansdale, and Burton Peter Block, Wayne, Pa., assignors to Pennsalt Chemicals Corporation, Philadelphia, Pa., a corporation of Pennsylvania
No Drawing. Filed Aug. 13, 1965, Ser. No. 479,621
Int. Cl. C07f 11/00
U.S. Cl. 260—329                                14 Claims

ABSTRACT OF THE DISCLOSURE

Compounds of the general formula $Cr(OPR_1R_2O)_2 \cdot X$ where $R_1$ and $R_2$ are inert organic groups and X is a neutral organic molecule coordinated with the chromium atom.

---

This invention relates to novel complexes derived from octahedral metal phosphinates which compounds are useful in the preparation of inorganic polymers. More particularly, the invention is concerned with the compounds having the general formula $Cr(OPR_1R_2O)_2 \cdot X$, where $R_1$ and $R_2$ are inert organic groups and X is a neutral organic molecule coordinated with the chromium atom.

The $OPR_1R_2O$ portion of the above structure is derived from a compound of the formula $R_1R_2P(O)OH$ where $R_1$ and $R_2$ are the same or different organic groups such as alkyl, aryl, alkoxy, or aryloxy. Preferably, R will be a hydrocarbon alkyl or aryl group containing from 1 to 10 carbon atoms such as, for example, methyl, ethyl, t-butyl, hexyl, octyl, phenyl, tolyl, xylyl, naphthyl and the like. Other groups represented by $R_1$ and $R_2$ will include methoxy, ethoxy, phenyloxy, and the like.

The neutral organic molecule capable of coordinating with the chromium metal and indicated by X in the above formula will be selected from the group of liquids consisting of lower aliphatic alcohols (e.g. methanol, ethanol, isopropanol and butanol) and five and six membered ring heterocyclic compounds wherein the non-carbon ring atom is oxygen or sulfur. Examples of the heterocyclic compounds include furan, tetrahydrofuran, thiophene, tetrahydrothiophene, dioxane, and the like.

Preferably, X will be selected from the group of lower aliphatic alcohols and heterocyclic compounds containing a five membered ring and the most preferred neutral organic liquid for use in this invention will be tetrahydrofuran.

The method by which the compounds of the invention are made involves first dissolving a chromium diacetate hydrate (i.e. the monohydrate, dihydrate, etc.) in the neutral organic coordinating liquid (e.g. tetrahydrofuran). It is frequently desirable that the neutral organic liquid be heated in order to ensure solution of the metal salt. After this solution is prepared it is treated with a dehydrating agent, such as magnesium sulfate, to remove any water of hydration which is present in the metal salt and permit substitution of the neutral coordinating molecule for the water of hydration.

The the phosphinic acid is added to the solution and a compound corresponding to the structure given above slowly precipitates at room temperature or with cooling. The product may then be filtered off, purified by washing and dried.

The compounds of the invention are highly colored with the specific color depending on the configuration of $R_1$ and $R_2$ and upon the particular neutral coordinating molecule used. The compounds in general are crystalline in nature and are extremely air sensitive since the divalent metal is readily oxidized to its trivalent state. Thus, preparation of the compounds should be made in an inert atmosphere, as for example, under nitrogen or argon to avoid oxidation of the metal to the trivalent state.

EXAMPLE 1

Chromium diacetate monohydrate (0.080 mole, 15.04 grams) was dissolved in 350 milliliters of tetrahydrofuran by refluxing until a clear, purple solution was obtained. About 10 grams of anhydrous magnesium sulfate was added to the solution and the mixture was stirred for an hour and filtered. Then a suspension of 23.7 grams (0.152 mole) of methylphenylphosphinic acid dissolved in 50 milliliters of tetrahydrofuran was added to the filtrate and the reaction mixture gently stirred to give a clear blue solution. On standing, a light blue solid gradually deposited from the solution and after several hours the solid was separated by filtration. After washing the solid twice with 50 milliliters of tetrahydrofuran and removing the solvent by holding the solid under vacuum at 1 millimeter mercury pressure for 1 hour, there was obtained 30.7 grams or a 94% yield of dry $$Cr[OP(CH_3)(C_6H_5)O]_2$$

tetrahydrofuran. The blue colored product is soluble in benzene and toluene, has a crystalline X-ray diffraction pattern and its infrared spectrum is consistent with the structure given.

Analysis for the compound is as follows:
Calculated for $Cr[OP(CH_3)(C_6H_5)O]_2 \cdot C_4H_8O$. C, 49.80; H, 5.53; Cr, 11.9; P, 14.28. Found: C, 49.54; H, 5.22; Cr, 11.3; P, 14.58.

EXAMPLE 2

Following the details and procedural steps of Example 1, 4.56 grams (0.0242 mole) of chromium diacetate monohydrate was treated with 9.70 grams (0.0480 mole) of diphenylphosphinic acid. The product $$Cr[OP(C_6H_5)_2O]_2 \cdot C_4H_8O$$

was blue and turned pink during drying under a stream of nitrogen.

EXAMPLE 3

Following the details of Example 1, 1.67 grams of chromium diacetate monohydrate was treated with 1.5 grams of dimethylphosphinic acid to yield $$Cr[OP(CH_3)_2O]_2 \cdot C_4H_8O$$

This blue product turned pink under high vacuum at room temperature. Exposure of the compound to air, either in the pink form or blue form, resulted in immediate oxidation to a green solid which analyzed for the inorganic polymer having the structure $$[Cr(H_2O)(OH)(OP(CH_3)_2O)_2]_m$$

which corresponds to the inorganic polymers described in Inorganic Chemistry 3 1699 (1964).

EXAMPLE 4

A 3.3 g. (0.0174 mole) sample of chromium diacetate monohydrate was dissolved in 150 ml. of deaerated methanol by refluxing until a clear scarlet solution was obtained. About 10 g. of anhydrous $MgSO_4$ was added to the solution and the mixture was stirred for an hour and filtered. A suspension of 5.4 g. (0.0347 mole) of $$(CH_3)(C_6H_5)P(O)OH$$

in 25 ml. of $CH_3OH$ was added to the filtrate and the reaction mixture was gently stirred to give a blue solution. The light blue solid which was gradually deposited was isolated under a nitrogen atmosphere. The solid product was washed twice with deaerated $CH_3OH$ and dried by pumping at 0.1 mm. Hg pressure and room temperature for 1 hr. Its infrared spectrum is consistent with $$Cr[OP(CH_3)(C_6H_5)O]_2 \cdot CH_3OH$$

*Analysis.*—Calcd. for $C_{15}H_{20}CrO_5P_2$: Cr, 13.2. Found: Cr, 13.0.

Oxidation of the above product by suspending it in an aqueous methanol solution and exposing it to air while agitating yielded the polymer having the repeating structure $[Cr(H_2O)(OH)(OP(CH_3)(C_6H_5)O)_2]_m$.

EXAMPLE 5

A mixture of 6.36 g. (0.0338 mole) of chromium diacetate monohydrate and 20 g. of anhydrous $MgSO_4$ in 150 ml. of deaerated thiophene was refluxed for 30 minutes under a slow stream of nitrogen and then 10.54 g. (0.0676 mole) of $(CH_3)(C_6H_5)P(O)OH$ was introduced. The reaction mixture was refluxed for 45 minutes and filtered. The blue violet filtrate was collected under a nitrogen atmosphere. About 250 ml. of deaerated n-hexane was added to the filtrate to give a grayish-blue precipitate which was collected, washed several times with n-hexane and dried by pumping at 0.1 mm. Hg pressure and room temperature for 1 hour. The infrared spectrum of the product is consistent with $$Cr[OP(CH_3)(C_6H_5)O]_2 \cdot C_4H_4S$$

*Analysis.*—Calculated for $C_{18}H_{20}CrO_4P_2S$: C, 48.4; H, 4.5. Found: C, 48.1; H, 5.03.

EXAMPLE 6

Instead of using thiophene in Example 5, tetrahydrothiophene may be used to yield $$Cr[OP(CH_3)(C_6H_5)O]_2 \cdot C_4H_8S$$

EXAMPLE 7

Likewise, dioxane may be used in Example 4 as the neutral coordinating molecule to give $$Cr[OP(CH_3)(C_6H_5)O]_2 \cdot C_4H_8O_2$$

EXAMPLE 8

When furan is used for tetrahydrofuran in Example 2, the product is $Cr[OP(C_6H_5)_2O]_2 \cdot C_4H_4O$.

The compounds of the invention may be named in accordance with the well known nomenclature system of inorganic chemistry found in the Journal of the American Chemical Society, 82 5536 (1960). Thus, according to Section 6 of this procedure, the complex compound of the invention which is described in Example 1 is named chromium (II) methylphenylphosphinate monotetrahydrofuranate. In like manner the compounds of Examples 2 to 8 are named as follows:

Example:
2 _____ Chromium (II) diphenylphosphinate monotetrahydrofuranate.
3 _____ Chromium (II) dimethylphosphinate monotetrahydrofuranate.
4 _____ Chromium (II) methylphenylphosphinate monomethanolate.
5 _____ Chromium (II) methylphenylphosphinate monothiopheneate.
6 _____ Chromium (II) methylphenylphosphinate monotetrahydrothiopheneate.
7 _____ Chromium (II) methylphenylphosphinate monodioxaneate.
8 _____ Chromium (II) diphenylphosphinate monotetrahydrofuranate.

We claim:
1. A compound of the structure $Cr(OPR_1R_2O)_2 \cdot X$ where $R_1$ and $R_2$ are organic groups containing from 1 to 10 carbon atoms selected from the class consisting of alkyl, aryl, alkoxy, and aryloxy, wherein said organic groups are unsubstituted in the hydrocarbon portion thereof, and where X is a neutral organic molecule selected from the group consisting of lower aliphatic alcohols and 5 and 6 membered ring heterocyclic compounds selected from the group consisting of furan, tetrahydrofuran, thiophene, tetrahydrothiophene and dioxane, said neutral organic molecule being coordinated with the chromium atom.

2. A compound as in claim 1 where $R_1$ and $R_2$ are hydrocarbon alkyl aryl groups containing from 1 to 10 carbon atoms.

3. A compound as in claim 2 where X is tetrahydrofuran.

4. Chromium (II) methylphenylphosphinate monotetrahydrofuranate.

5. Chromium (II) diphenylphosphinate monotetrahydrofuranate.

6. Chromium (II) dimethylphosphinate monotetrahydrofuranate.

7. Chromium (II) methylphenylphosphinate monomethanolate.

8. Chromium (II) methylphenylphosphinate monothiopheneate.

9. The method of preparing a compound of claim 1 which comprises dissolving a hydrated salt of chromium diacetate in a neutral organic liquid selected from the group consisting of lower aliphatic alcohols and five and six membered ring heterocyclic compounds selected from the group consisting of furan, tetrahydrofuran, thiophene, tetrahydrothiophene, and dioxane treating said solution with a dehydrating agent, adding a compound of structure $R_1R_2P(O)(OH)$ where $R_1$ and $R_2$ are hydrocarbon alkyl or aryl groups containing from 1 to 10 carbon atoms and separating the solid precipitate which forms.

10. The process of claim 9 where $R_1$ and $R_2$ are phenyl and the neutral organic liquid is tetrahydrofuran.

11. The process of claim 9 where $R_1$ is phenyl, $R_2$ is methyl and the neutral organic liquid is tetrahydrofuran.

12. The process of claim 9 where $R_1$ is phenyl, $R_2$ is methyl and the neutral organic liquid is methanol.

13. The process of claim 9 where $R_1$ is phenyl, $R_2$ is methyl and the neutral organic liquid is thiophene.

14. The process of claim 9 where $R_1$ and $R_2$ are methyl and the neutral organic liquid is tetrahydrofuran.

References Cited

UNITED STATES PATENTS 3,275,574    9/1966    Saraceno _____ 260—2

FOREIGN PATENTS 1,395,910    3/1965    France.

OTHER REFERENCES

Chemical and Engineering News, July 30, 1962, pp. 52 to 54.

Chemical and Engineering News, Dec. 21, 1964, pp. 40, 41.

Inorganic Chemistry, vol. 3, No. 12, pp. 1699–1703, December 1964.

HENRY R. JILES, *Primary Examiner.*

C. M. SHURKO, *Assistant Examiner.*

U.S. Cl. X.R.

260—2, 340.6, 346.1, 438.5